(12) United States Patent
Byrd et al.

(10) Patent No.: US 10,804,747 B1
(45) Date of Patent: Oct. 13, 2020

(54) WIRELESS POWER TRANSFER FOR A ROTATING TURRET SYSTEM

(71) Applicant: Lockheed Martin Corporation, Bethesda, MD (US)

(72) Inventors: Thomas E. Byrd, Grand Prairie, TX (US); Joshua E. Baer, Fort Worth, TX (US); David L. Hunn, Kennedale, TX (US)

(73) Assignee: Lockheed Martin Corporation, Bethesda, MD (US)

(*) Notice: Subject to any disclaimer, the term of this patent is extended or adjusted under 35 U.S.C. 154(b) by 315 days.

(21) Appl. No.: 15/479,043

(22) Filed: Apr. 4, 2017

(51) Int. Cl.
| | |
|---|---|
| *H02J 50/20* | (2016.01) |
| *H02J 50/80* | (2016.01) |
| *H02J 50/90* | (2016.01) |
| *F41A 23/24* | (2006.01) |
| *F41A 23/34* | (2006.01) |

(52) U.S. Cl.
CPC ............. *H02J 50/20* (2016.02); *F41A 23/24* (2013.01); *F41A 23/34* (2013.01); *H02J 50/80* (2016.02); *H02J 50/90* (2016.02)

(58) Field of Classification Search
CPC . H02J 50/20; H02J 50/90; H02J 50/80; F41A 23/34; F41A 23/24
USPC .......................................... 307/104; 361/108
See application file for complete search history.

(56) References Cited

U.S. PATENT DOCUMENTS

| | | | | |
|---|---|---|---|---|
| 2007/0276538 | A1* | 11/2007 | Kjellsson | B25J 19/0025 700/245 |
| 2011/0169337 | A1* | 7/2011 | Kozakai | H02J 5/005 307/104 |
| 2014/0159501 | A1* | 6/2014 | Kanno | H01F 38/14 307/104 |
| 2016/0279808 | A1* | 9/2016 | Doughty | G01D 5/34738 |
| 2017/0047787 | A1* | 2/2017 | Akuzawa | H01F 38/18 |

OTHER PUBLICATIONS

Unknown Author, Motion Technology Slip Ring Product Catalog, Published by Moog, Revision Aug. 2016, p. 140-153.*
Author Unknown, "Vehicular Slip Rings," Motion Technology Catalog, 2016, Moog Components Group, http://www.moog.com/products/slip-rings/aerospace-military-slip-rings/vehicular-slip-rings.html , pp. 140-145.

* cited by examiner

*Primary Examiner* — Rexford N Barnie
*Assistant Examiner* — Thai H Tran
(74) *Attorney, Agent, or Firm* — Withrow & Terranova, PLLC

(57) ABSTRACT

A turret system includes a base subassembly and a turret subassembly. The base subassembly includes a base housing and a first turret mounting interface coupled to the base housing. The base subassembly also includes a first antenna configured to wirelessly transmit an electrical power signal. The turret subassembly includes a turret housing and a second turret mounting interface coupled to the turret housing. The second turret mounting interface is configured to rotate with respect to the first turret mounting interface, thereby rotating the turret housing with respect to the base housing. The turret subassembly further comprises a second antenna configured to wirelessly receive the electrical power signal from the first antenna.

20 Claims, 7 Drawing Sheets

WIRELESS POWER TRANSFER FOR A ROTATING TURRET SYSTEM

TECHNICAL FIELD

Embodiments relate to power transfer and, more particularly, to wireless power transfer for a rotating turret system.

BACKGROUND

Rotating turret systems have a wide range of applications, such as, for example, a weapon platform or an object detection system. A turret is rotatable with respect to a base in order to orient or aim a component of the turret, such as a weapon or object detection sensor. In many turret systems, such as tanks, aircraft, and object detection systems such as RADAR, rotation of the turret is powered by a turret mounting subassembly that rotatably couples the turret to the base, with power typically provided to the turret from the base. For these applications, however, it may be difficult to provide electrical power to the rotating turret, particularly if the turret is configured to indefinitely rotate. Accordingly, there is a need for an efficient and reliable method of electrical power delivery to a turret of a rotating turret system.

SUMMARY

Embodiments relate to power transfer, and more particularly to wireless power transfer for a rotating turret system. In an embodiment, a turret system includes a base and a turret that is rotatable about the base. The base has a first antenna (e.g., a transmitting antenna) for wirelessly transmitting an electrical power signal to a second antenna (e.g., a receiving antenna) in the turret. The first antenna is disposed in a turret mounting interface in the base, and the second antenna is disposed in a complementary turret mounting interface in the turret. In this manner, electrical power can be delivered to the turret wirelessly to power the electrical components therein.

One advantage of this arrangement is that electrical power can be transferred between a base and a turret more efficiently than many conventional power transfer arrangements, such as, for example, a slip-ring assembly. The first antenna and the second antenna also do not need to be in contact with each other, thereby avoiding excessive wear on the power transfer components.

According to one embodiment, a turret system is disclosed. The turret system comprises a base subassembly. The base subassembly comprises a base housing and a first turret mounting interface coupled to the base housing. The base subassembly further comprises a first antenna configured to wirelessly transmit an electrical power signal. The turret system further comprises a turret subassembly. The turret subassembly comprises a turret housing and a second turret mounting interface coupled to the turret housing. The second turret mounting interface is configured to rotate with respect to the first turret mounting interface. The turret subassembly further comprises a second antenna configured to wirelessly receive the electrical power signal from the first antenna.

According to another embodiment, an antenna system for a turret is disclosed. The antenna system comprises a first antenna configured to be coupled to a first turret mounting interface of a turret base. The first antenna is further configured to wirelessly transmit an electrical power signal. The antenna system further comprises a second antenna configured to be coupled to a second turret mounting interface of a turret subassembly. The second antenna is further configured to rotate with respect to the first antenna in response to rotation of the second turret mounting interface with respect to the first turret mounting interface. The second antenna is further configured to wirelessly receive the electrical power signal from the first antenna.

According to another embodiment, a method of wirelessly transferring power is disclosed. The method comprises providing an electrical power signal from an electrical component of a base subassembly of a turret system to a first antenna coupled to a first turret mounting interface disposed in the base subassembly. The method further comprises wirelessly transmitting the electrical power signal from the first antenna. The method further comprises receiving the electrical power signal from the first antenna by a second antenna coupled to a second turret mounting interface. The second turret mounting interface is disposed in a turret subassembly of the turret system, and the second antenna is configured to rotate with respect to the first antenna in response to the second turret mounting interface rotating with respect to the first turret mounting interface. The method further comprises providing the electrical power signal from the second antenna to an electrical component of the turret subassembly coupled to the second antenna.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

communication between a first RF antenna associated with the base subassembly of the armored fighting vehicle and a second RF antenna associated with the turret subassembly of the armored fighting vehicle.

DETAILED DESCRIPTION

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first antenna" and "second antenna," and does not imply a priority, a type, an importance, or other attribute, unless otherwise stated herein. The term "substantially" used herein in conjunction with a numeric value means any value that is within a range of five percent (5%) greater than or ten percent less than the numeric value. As used herein and in the claims, the articles "a" and "an" in reference to an element refers to "one or more" of the element unless otherwise explicitly specified.

Embodiments relate to power transfer, and more particularly to wireless power transfer for a turret system. In an embodiment, a turret system includes a base and a turret that is rotatable about the base. The base has a first antenna (e.g., a transmitting antenna) for wirelessly transmitting an electrical power signal to a second antenna (e.g., a receiving antenna) in the turret. The first antenna is disposed in a turret mounting interface in the base, and the second antenna is disposed in a complementary turret mounting interface in the turret. In this manner, electrical power can be delivered to the turret wirelessly to power the electrical components therein.

One advantage of this arrangement is that electrical power can be transferred between the base and the turret more efficiently than many conventional power transfer arrangements, such as, for example, a slip-ring assembly. The first antenna and the second antenna also do not need to be in contact with each other, thereby avoiding excessive wear on the power transfer components.

Figure 1:
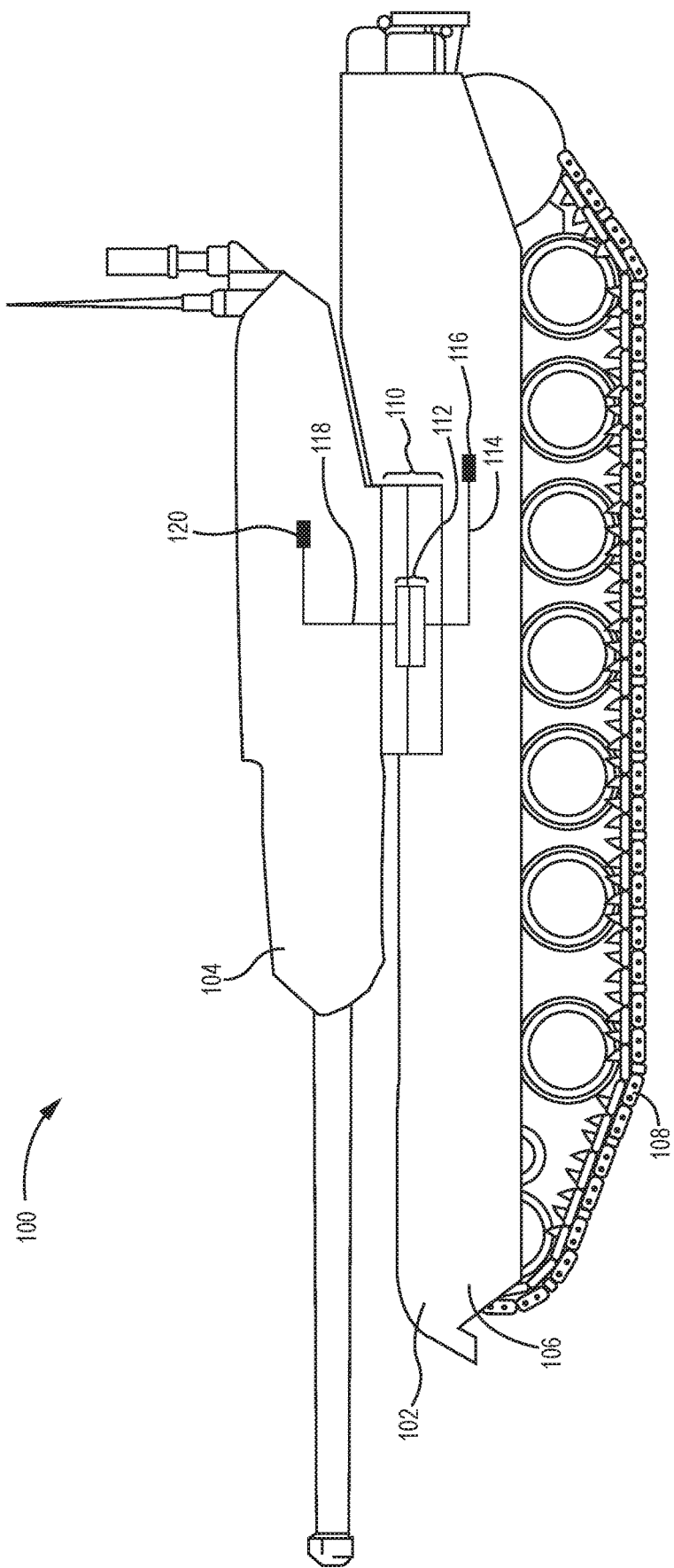
FIG. 1 is a diagram illustrating an armored fighting vehicle that includes a rotating turret system using a conventional slip-ring assembly to provide power from a base of the armored fighting vehicle to a rotatable turret of the armored fighting vehicle.

Before discussing the embodiments herein, a conventional armored fighting vehicle 100 (a tank in this example) will be described herein with respect to FIG. 1. FIG. 1 is a diagram illustrating the conventional armored fighting vehicle 100 that includes a rotating turret system using a conventional slip-ring assembly to provide power from a base of the conventional armored fighting vehicle 100 to a rotatable turret of the armored fighting vehicle 100. The conventional armored fighting vehicle 100 of FIG. 1 includes a base 102 and a turret 104, with the turret 104 rotatably mounted to the base 102. The base 102 may include armor plating 106 to provide protection from enemy fire for the armored fighting vehicle 100, and the base 102 may also include a plurality of treads 108 to provide locomotion for the armored fighting vehicle 100. The turret 104 is rotatably coupled to the base 102 via a turret mounting subassembly 110, which provides a powered and rotatable mechanical connection between the turret 104 and the base 102.

In this conventional armored fighting vehicle 100, the turret 104 is configured to be able to be rotated indefinitely through an indefinite number of revolutions, e.g., 360° or more. This provides added versatility for the turret 104 of the armored fighting vehicle 100, but this arrangement has drawbacks as well. In addition to the ability to indefinitely rotate, it is also desirable for the turret 104 to receive electrical power from the base 102, which typically contains an alternator coupled to an engine or another power source that can be used to provide electrical power to the entire armored fighting vehicle 100. Since the only mechanical connection between the turret 104 and the base 102 for the armored fighting vehicle 100 is the turret mounting subassembly 110, conventional wiring schemes are not practical, because the indefinite rotation of the turret 104 through multiple revolutions would subject this conventional wiring scheme to undesirable twisting, stresses, and eventual breakage. As a result, it can be difficult and complex to provide electrical power from the base 102 to the turret 104 of the armored fighting vehicle 100.

One solution that is currently used in conventional armored fighting vehicles 110 is a slip-ring assembly 112, which employs brush connections to conduct electricity between the base 102 and the turret 104. The slip-ring assembly 112 is used to electrically couple one or more power connections 114 and/or electrical components 116 in the base 102 with one or more power connections 118 and/or electrical components 120 in the turret 104. However, conventional slip-ring assemblies 112 have limited power transfer capabilities, are expensive and bulky, and can exhibit reliability issues. Conventional slip-ring assemblies 112 are also mechanically complex, and difficult to service. For example, mechanical wear and breakage from the brush contacts is a common issue with conventional slip-ring assemblies 112, which increases the time and expense required for maintenance and repair of the slip-ring assembly 112. In addition, modern rotating turrets, such as the turret 104 of the armored fighting vehicle 100, require an increasing amount of power as the power requirements of the electrical components 120 increase. For example, modern rotating turrets may include advanced sensor suites, active self-defense systems, and cannon electrical controls, which may have electrical power requirements that exceed the capabilities of conventional slip-ring assemblies 112. Accordingly, there is a need for an efficient method of providing power in a turret system that reduces bulk, is easier and less expensive to maintain and service, and has higher reliability than conventional slip-ring assemblies 112.

Figure 2:
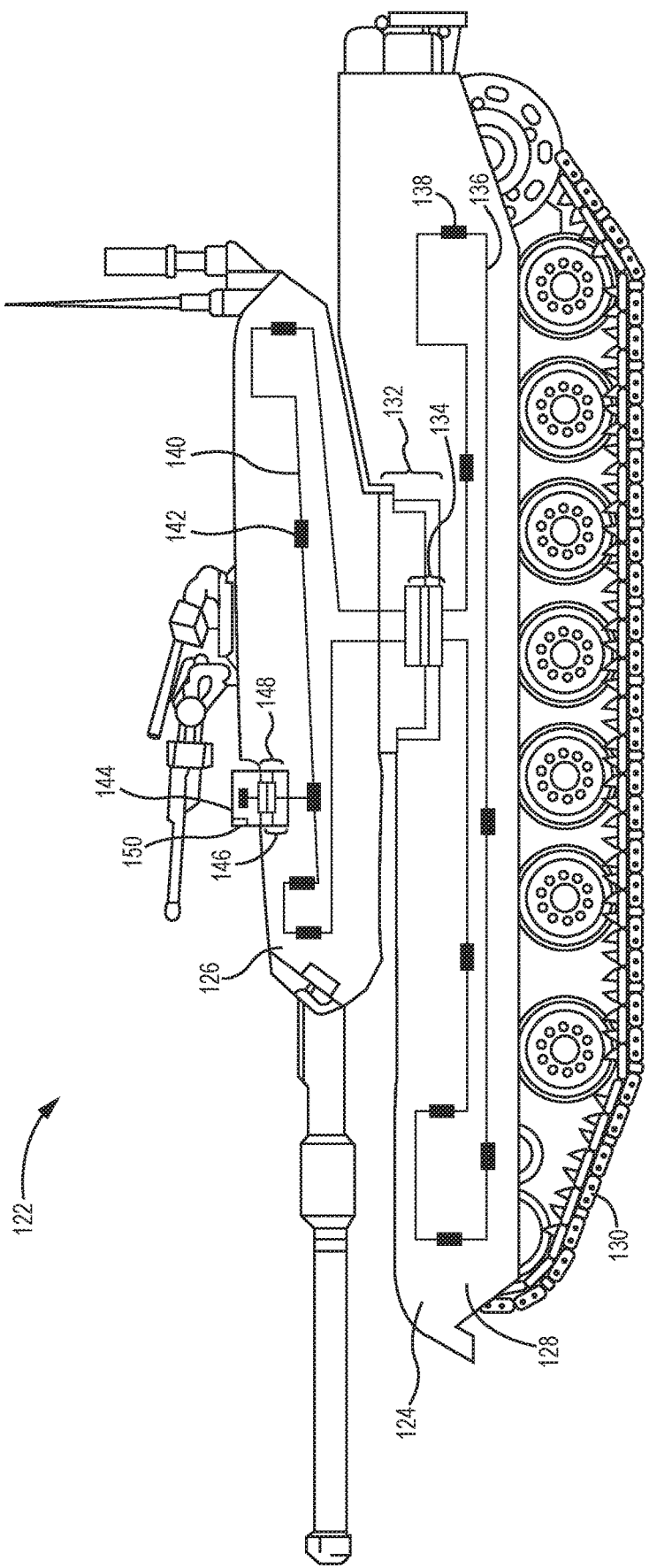
FIG. 2 is a diagram illustrating an armored fighting vehicle having a rotating turret system according to an embodiment that uses an antenna system to wirelessly transfer power between the base of the armored fighting vehicle and the rotatable turret of the armored fighting vehicle.

In this regard, FIG. 2 illustrates an armored fighting vehicle 122 having a base 124 and a turret 126 similar to the base 102 and the turret 104 of the conventional armored fighting vehicle 100 of FIG. 1. The base 124 of the armored fighting vehicle 122 includes armor plating 128 and a plurality of treads 130, similar to the base 102 of the conventional armored fighting vehicle 100 of FIG. 1. The armored fighting vehicle 122 includes a turret mounting subassembly 132 for mechanically rotating the turret 126 with respect to the base 124, but in this embodiment, the armored fighting vehicle 122 includes a wireless power transmission subassembly 134 for wirelessly providing electrical power to the turret 126.

As will be described in greater detail below, the wireless power transmission subassembly 134 of FIG. 2 allows inductive wireless electrical power to be provided to the turret 126, and also allows for the simultaneous transmission of a data-bearing signal between the base 124 and the turret 126. This allows the armored fighting vehicle 122 to be designed so that the turret mounting subassembly 132 is the only mechanical connection between the base 124 and the turret 126. One advantage of this arrangement is that a turret 126 can be removed from the base 124 and replaced more easily. As will be discussed below as well, the wireless power transmission subassembly 134 may be significantly more efficient than the conventional slip-ring assembly 112 of FIG. 1, handling 150% more power than conventional slip-ring assemblies 112 during testing, and achieving a total large scale power efficiency of 83% or more during testing. The wireless power transmission subassembly 134 may also be 50% less expensive than comparable slip-ring assemblies 112. Reliability of the wireless power transmission subassembly 134 is also significantly increased over conventional slip-ring assemblies 112, because the wireless power transmission subassembly 134 does not require brushes, which may wear out over time in conventional slip-ring assemblies 112.

In this embodiment, one or more power connections 136 in the base 124 are connected to one or more electrical components 138, including, for example, a power generator. The turret 126 includes one or more power connections 140 connected to one or more electrical components 142, but, as discussed above, a turret 126 may not include its own power generation capability. Because the wireless power transmission subassembly 134 performs as well as or better than a comparable conventional slip-ring assembly, the wireless power transmission subassembly 134 is configured to draw power from electrical components in the base 124, such as an alternator for example, and transmit sufficient electrical power from the base 124 to the turret 126 to operate the power connections 140 and the electrical components 142 of the turret 126. In this example, the armored fighting vehicle 122 may also include one or more secondary turrets 144, such as, for example, a forward-looking infrared (FLIR) imaging system, another type of imaging system, a RADAR system, a LIDAR system, or a SONAR system. In this example, the secondary turret 144 is rotatably mounted to the main turret 126 by a turret mounting subassembly 146 having its own wireless power transmission subassembly 148, providing power from the power connections 140 in the main turret 126 and the components of the secondary turret 144, such as a sensor subassembly 150.

Figure 3:
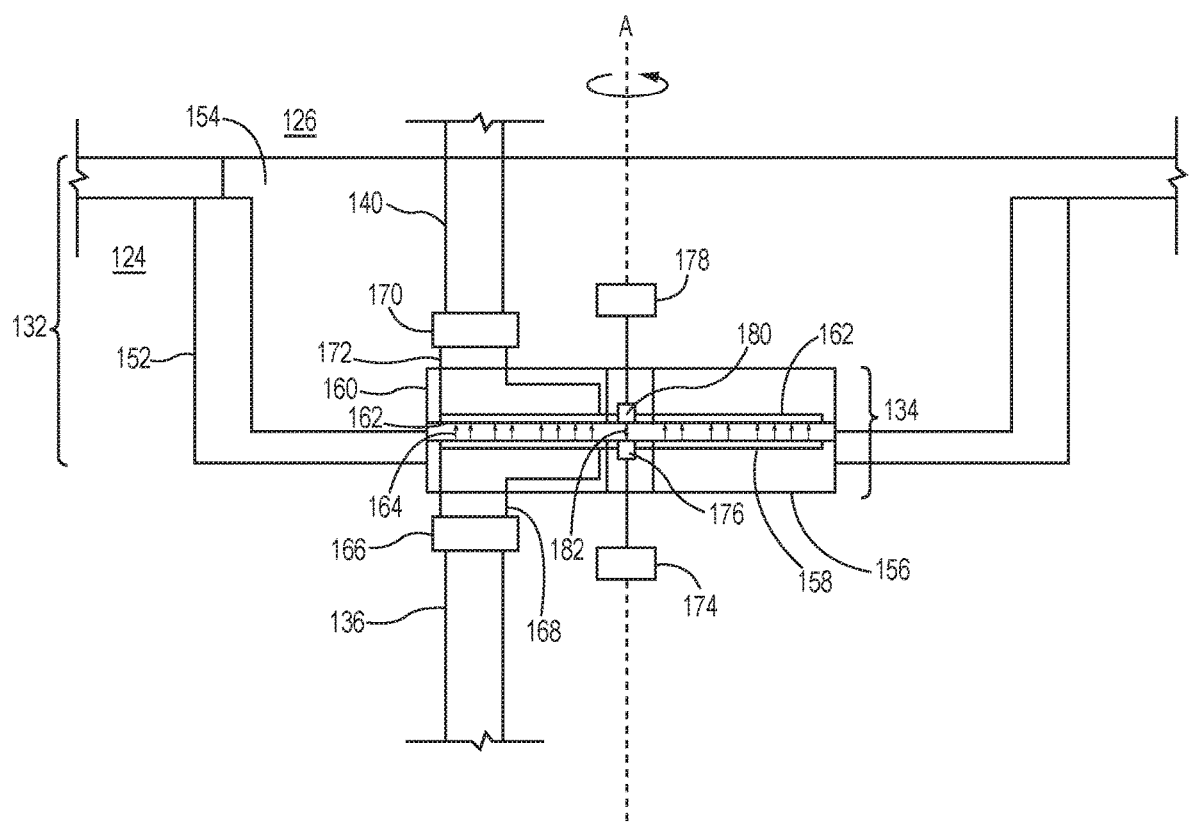
FIG. 3 is a more detailed partial schematic diagram illustrating the antenna system of the armored fighting vehicle of FIG. 2.

Referring now to FIG. 3, a detailed schematic view of the turret mounting subassembly 132 and the wireless power transmission subassembly 134 of FIG. 2 is illustrated. The turret mounting subassembly 132 includes a first turret mounting interface 152 that may be fixedly coupled to the base 124 of the armored fighting vehicle 122, and a second turret mounting interface 154 that may be fixedly coupled to the turret 126 of the armored fighting vehicle 122. In this manner, the turret mounting subassembly 132 is configured to drive the second turret mounting interface 154 with respect to the first turret mounting interface 152 to rotate the turret 126 with respect to the base 124.

In this embodiment, the wireless power transmission subassembly 134 includes a first antenna subassembly 156 that may be fixedly coupled to the first turret mounting interface 152 or another part of the base 124, and a second antenna subassembly 160 having a second antenna 162 that may be fixedly coupled to the second turret mounting interface 154 or another part of the turret 126. The first antenna subassembly 156 is mounted in the center of the first turret mounting interface 152 with respect to an axis of rotation A of the first turret mounting interface 152 with respect to the second turret mounting interface 154. Similarly, in this example, a second antenna assembly 160 is mounted in the center of the second turret mounting interface 154 with respect to the axis of rotation A of the second turret mounting interface 154 with respect to the first turret mounting interface 152. Unlike the brushes of the conventional slip-ring assembly 112 of FIG. 1, the first antenna subassembly 156 and the second antenna subassembly 160 of the wireless power transmission subassembly 134 of FIG. 3 do not contact each other, and are therefore allowed to rotate freely with respect to each other in response to the turret mounting subassembly 132 rotating the turret 126 with respect to the base 124. As discussed above, because the first antenna subassembly 156 and the second antenna subassembly 160 form a proximity connection as opposed to a direct electrical connection, the turret 126 can be more easily and quickly removed from the base 124 for service, repair, or replacement.

In this example, the wireless power transmission subassembly 134 is configured for one-way wireless power transmission, i.e., a first antenna 158 is configured to wirelessly transmit an electrical power signal 164, and the second antenna 162 is configured to wirelessly receive the electrical power signal 164 from the first antenna 158. It should be understood, however, that in some embodiments, two-way power transmission may be employed. For example, the first antenna 158 and second antenna 162 could periodically alternate between a transmission mode and a receiving mode. In another example, a plurality of concentric first antennas 158 and corresponding concentric second antennas 162 may be used, with different pairs of first and second antennas 158, 162 being used for base-to-turret electrical power transmission or turret-to-base electrical power transmission, as desired.

In this example, a first power distribution system 166, which is connected to the power connections 136, provides the electrical power signal 164 to the first antenna 158 via a first antenna connection 168. A second power distribution system 170 disposed in the turret 126 receives the electrical power signal 164 from the second antenna 162 via a second antenna connection 172, and provides the electrical power signal 164 to the power connection 140 of the turret 126. In this manner, the wireless power transmission subassembly 134 allows an electrical component in one of the base 124 or the turret 126 to provide power to one or more electrical components of the other of the base 124 or the turret 126.

In this embodiment, the wireless power transmission subassembly 134 also includes a first optical communication device 174 including a first optical transceiver 176 coupled to the first antenna assembly 156 and a second optical communication device 178 including a second optical transceiver 180 connected to the second antenna assembly 160. To maintain alignment of the optical transceivers 176, 180 during rotation of the turret mounting subassembly 132, the optical transceivers 176, 180 are aligned in the axis of rotation A of the turret mounting subassembly 132. This allows for optical data signals 182 to be exchanged between the first and second optical transceivers 176, 180 without interruption during rotation of the turret 126 with respect to the base 124, and also provides an optical data connection between the base 124 and the turret 126 that does not require a direct physical connection between the base 124 and the turret 126. In testing, the bandwidth and efficiency of the optical transceivers 176, 180 are comparable to communication methods used in association with the conventional slip-ring assemblies 112 of FIG. 1. As a result, the wireless power transmission subassembly 134 is able to simultaneously provide power and data-bearing transmissions between the base 124 and the turret 126 with less complexity, and without giving up the advantages of the wireless power transmission subassembly 134 over the conventional slip-ring assemblies 112.

Figure 4A:
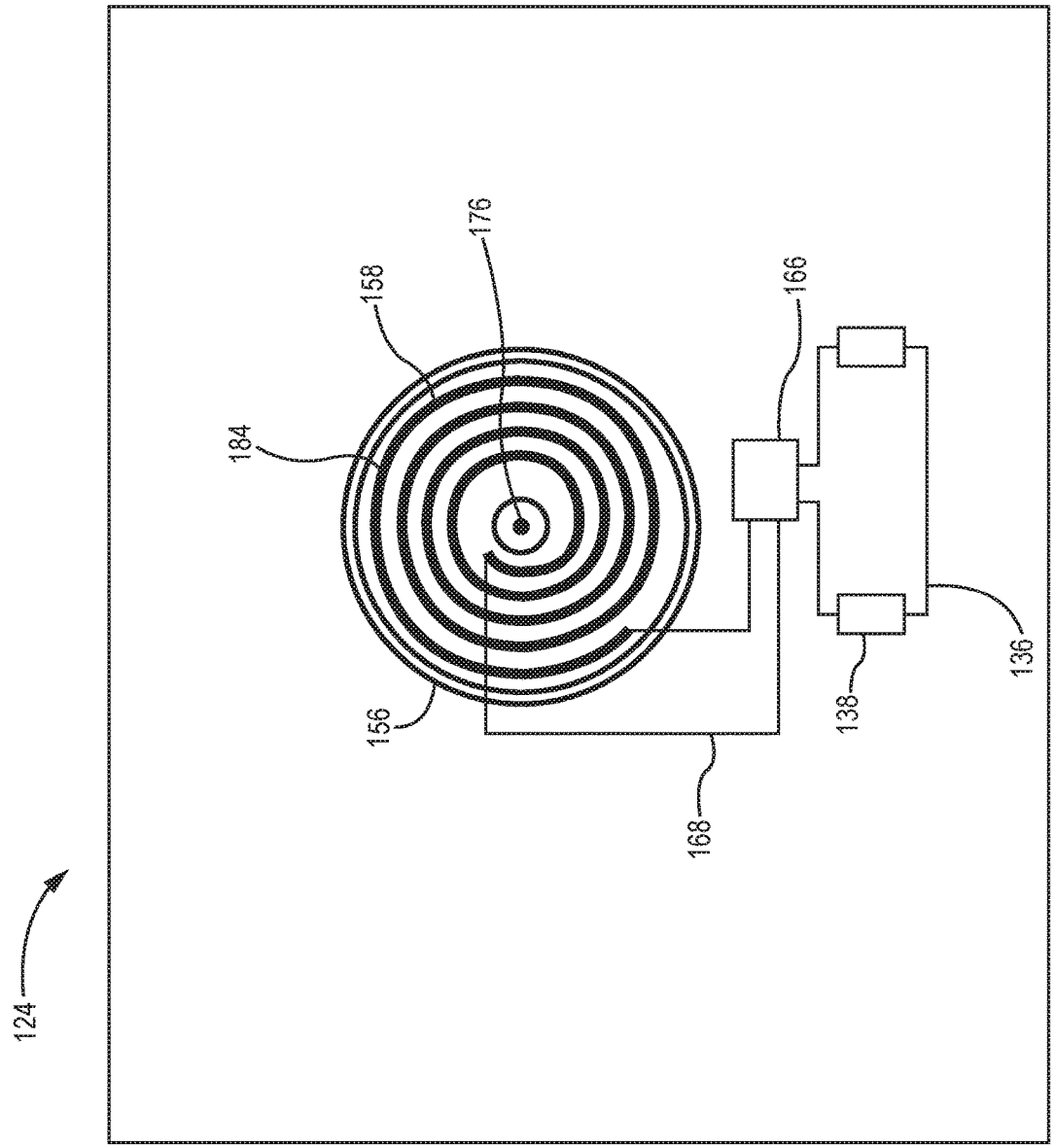
FIG. 4A is a top-down partial schematic diagram of the turret of the armored fighting vehicle of FIGS. 2 and 3, illustrating a spiral configuration for the antenna.
Figure 4B:
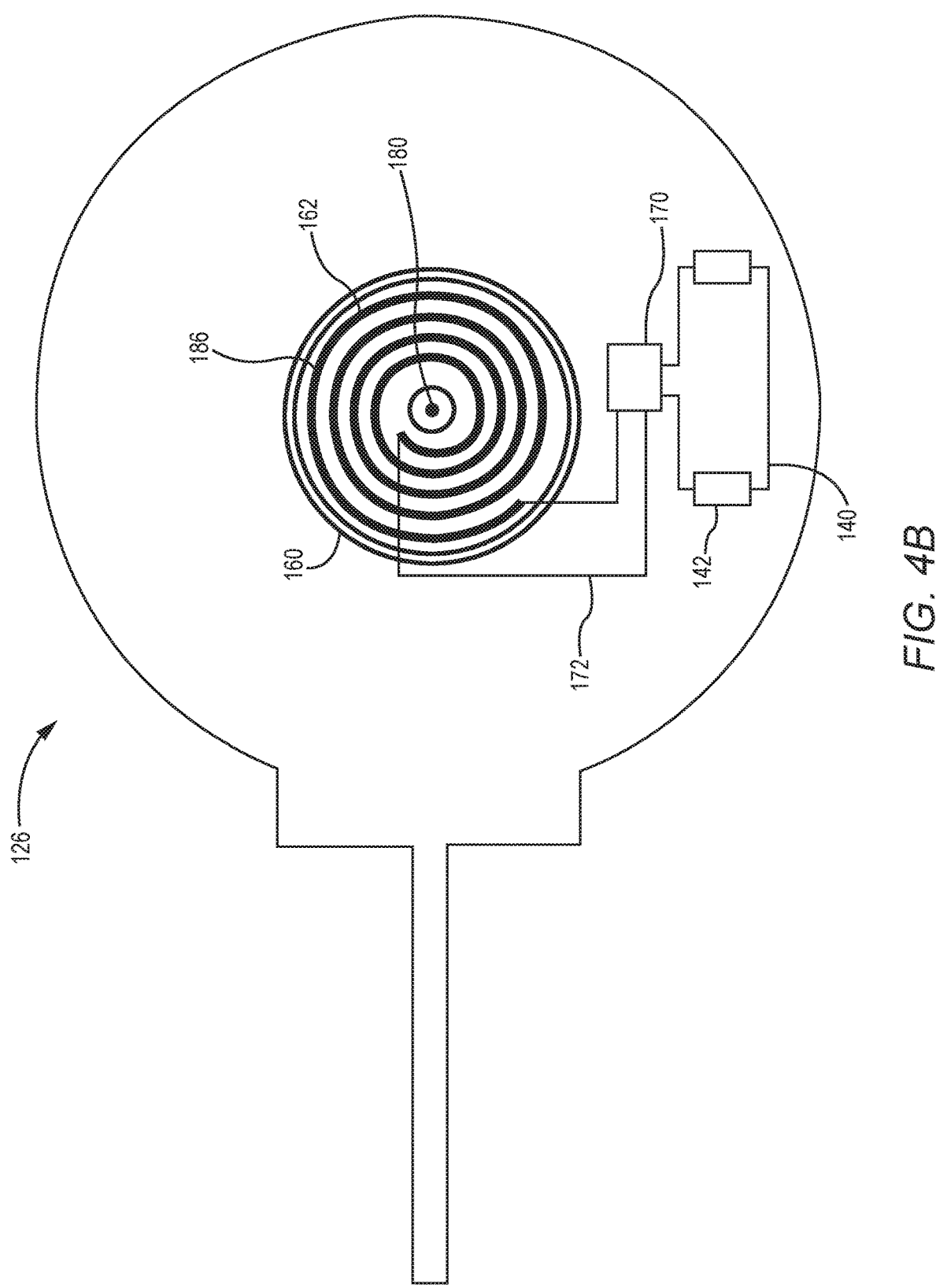
FIG. 4B is a top-down partial schematic diagram of the base of the armored fighting vehicle of FIGS. 2 and 3, illustrating a spiral configuration for the antenna corresponding in size and position to the turret antenna.

The first antenna 158 and the second antenna 162 may be formed in a number of ways. In this regard, FIG. 4A illustrates a top-down partial schematic diagram of the base 124 of the armored fighting vehicle 122 of FIGS. 2 and 3. In this embodiment, the first antenna 158 is formed from a cable 184 in a flat, spiral configuration to form a circular, ring-shaped coil coupled to the first antenna assembly 156. FIG. 4B illustrates a top-down partial schematic diagram of the turret 126 of the armored fighting vehicle 122 of FIGS. 2 and 3, corresponding to the base 124 of FIG. 4A. In FIG. 4B, the second antenna 162 is also formed from a cable 186 in a flat, spiral configuration to form a circular, ring-shaped coil coupled to the second antenna assembly 160 corresponding to the first antenna 158 of the turret 126. In this example, the first antenna 158 has a first external radius, and a first internal radius, and the second antenna 162 has a second external radius substantially equal to the first external radius, and a second internal radius substantially equal to the second external radius.

When the turret 126 is mounted on the base 124 via the turret mounting subassembly 132, the first antenna 158 and the second antenna 162 are vertically aligned with each other and remain vertically aligned with each other through full rotation of the turret 126 with respect to the base 124. In one embodiment, the first antenna 158 and the second antenna 162 are separated by one inch (1"), but testing has shown that a gap of up to three inches (3") also produces favorable results in comparison to the conventional slip-ring assembly 112 of FIG. 1, and that a gap of up to seven inches (7") may still produce acceptable results for certain applications.

Figure 5:
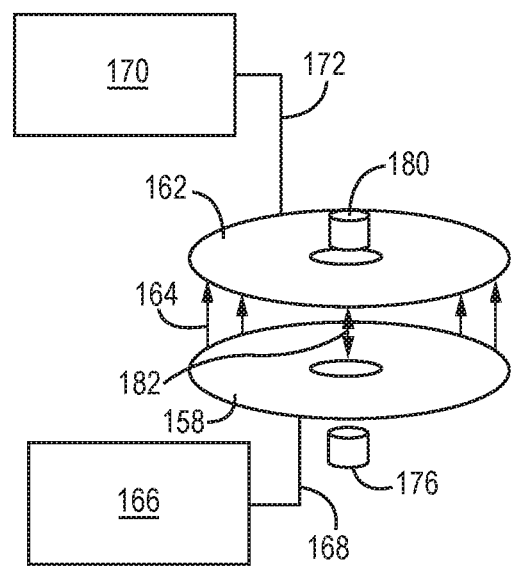
FIG. 5 is a schematic diagram of the antenna system of FIGS. 2-4, illustrating simultaneous transfer of electrical power between the first antenna and second antenna and optical communication between a first optical transceiver associated with the base subassembly of the armored fighting vehicle and a second optical transceiver associated with the turret subassembly of the armored fighting vehicle.

It should also be understood that, while the above embodiments employ optical data transmission, other types of data transmission may be used in association with the wireless power transmission subassembly 134. In this regard, FIG. 5 illustrates a schematic diagram of the antenna system of FIGS. 2-4B, illustrating simultaneous transfer of electrical power between the first antenna 158 and the second antenna 162 and optical communication between the first optical transceiver 176 associated with the base 124 of the armored fighting vehicle 122 and the second optical transceiver 180 associated with the turret 126 of the armored fighting vehicle 122.

In an alternative embodiment, a data-bearing signal may be independently transmitted by the first antenna 158, or may be embedded in the electrical power signal itself prior to transmission through the wireless power transmission subassembly 134. In this way, electrical components 138 of the base 124 may exchange data and communicate with electrical components 142 of the turret 126 without the need for additional hardware within the wireless power transmission subassembly 134.

Figure 6:
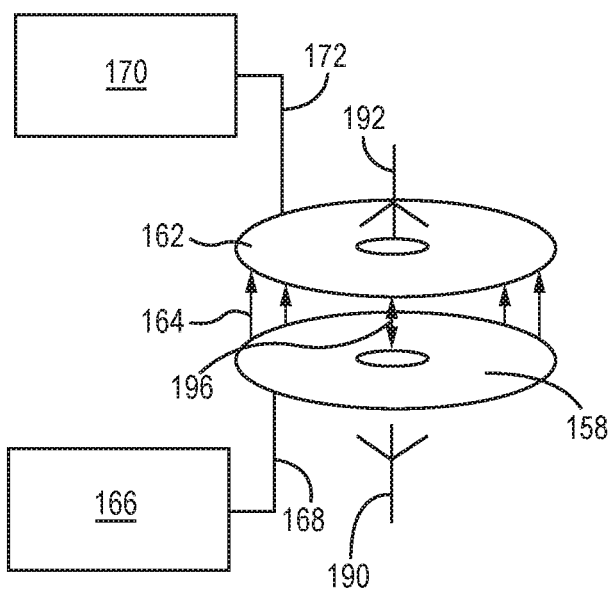
FIG. 6 is a schematic diagram of an antenna system similar to the antenna system of FIGS. 2-6, illustrating simultaneous transfer of electrical power between the first antenna and second antenna and radio frequency (RF)

Data may also be transmitted wirelessly, independently of the electrical power signal 164. In this regard, FIG. 6 illustrates a schematic diagram of an antenna system similar to the wireless power transmission subassembly 134 of FIGS. 2-5, illustrating simultaneous transfer of an electrical power signal 164 between the first antenna 158 and the second antenna 162 and a radio frequency (RF) signal 196 between a first RF antenna 190 associated with the base 124 of the armored fighting vehicle 122 and a second RF antenna 192 associated with the turret 126 of the armored fighting vehicle 122.

Figure 7:
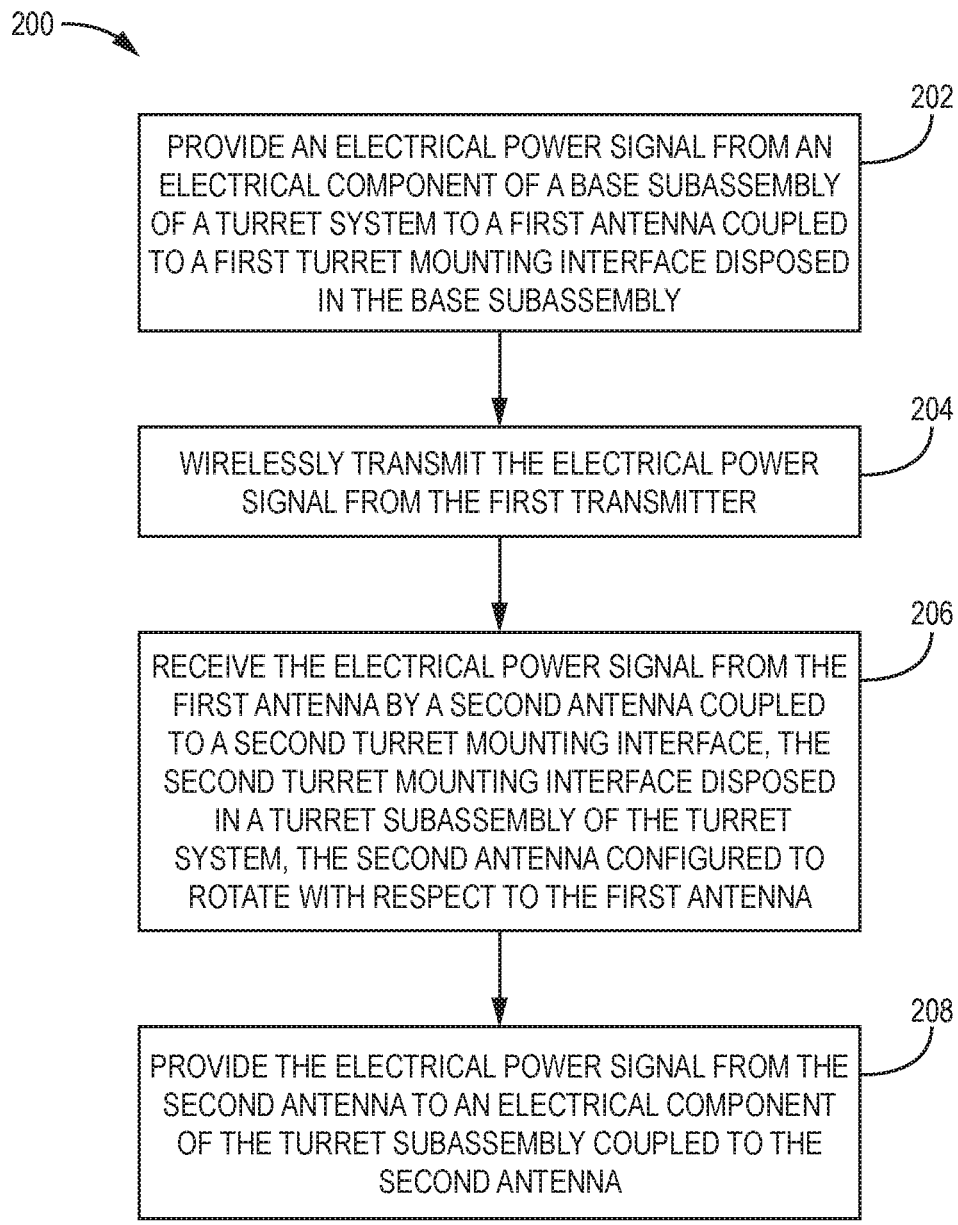
FIG. 7 is a flowchart diagram of a method of wirelessly transferring power between a base subassembly and a turret subassembly of a turret system.

FIG. 7 is a flowchart diagram of a method 200 of wirelessly transferring power between a base subassembly and a turret subassembly of a turret system, similar to the base 124 and turret 126 used by the armored fighting vehicle 122 of FIGS. 2-5. The method includes providing an electrical power signal from an electrical component of a base subassembly of a turret system to a first antenna (FIG. 7, block 202). The first antenna is coupled to a first turret mounting interface disposed in the base subassembly, similar to the first turret mounting interface 152 of the base 124 of FIGS. 2-5, for example. The method 200 further comprises wirelessly transmitting the electrical power signal from the first antenna (FIG. 7, block 204). The method 200 further comprises receiving the electrical power signal from the first antenna by a second antenna coupled to a second turret mounting interface (FIG. 7, block 206). The second turret mounting interface is disposed in a turret subassembly of the turret system, similar to the second turret mounting interface 154 of the turret 126 of FIGS. 2-5, for example. The second antenna is also configured to rotate with respect to the first antenna in response to the second turret mounting interface rotating with respect to the first turret mounting interface. The method 200 further comprises providing the electrical power signal from the second antenna to an electrical component of the turret subassembly coupled to the second antenna (FIG. 7, block 208), such as an electrical component 142 of the turret 126 of FIGS. 2-5, for example.

Those skilled in the art will recognize improvements and modifications to the preferred embodiments of the disclosure. All such improvements and modifications are considered within the scope of the concepts disclosed herein and the claims that follow.

What is claimed is:

1. A turret system comprising:
   a base subassembly comprising:
   a base housing;
   a first turret mounting interface coupled to the base housing;
   a first antenna mounted in a center of the first turret mounting interface, the first antenna configured to wirelessly transmit an electrical power signal, the first antenna having a first spiral configuration, being positioned in a first plane and having a first external radius; and
   a first optical transceiver; and
   a turret subassembly comprising:
   a turret housing;
   a second turret mounting interface coupled to the turret housing, the second turret mounting interface configured to rotate about an axis of rotation with respect to the first turret mounting interface;
   a second antenna mounted in a center of the second turret mounting interface, the second antenna configured to wirelessly receive the electrical power signal from the first antenna, the second antenna having a second spiral configuration, the first external radius and being positioned in a second plane that is parallel to and positioned a distance from the first plane, wherein the first spiral configuration and the second spiral configuration are a same spiral configuration aligned along a common axis; and a second optical transceiver aligned in the axis of rotation; and wherein the first optical transceiver is aligned in the axis of rotation and is configured to communicate with the second optical transceiver via optical signals while the second turret mounting interface rotates about the axis of rotation.

2. The turret system of claim 1, wherein the second antenna is further configured to:
rotate with respect to the first antenna in response to the second turret mounting interface rotating with respect to the first turret mounting interface; and
wirelessly receive the electrical power signal from the first antenna during rotation of the second antenna with respect to the first antenna.

3. The turret system of claim 1, wherein the first antenna is further configured to wirelessly transmit a data-bearing signal, and the second antenna is further configured to wirelessly receive the data-bearing signal from the first antenna.

4. The turret system of claim 3, wherein the data-bearing signal is embedded in the electrical power signal.

5. The turret system of claim 1, the base subassembly further comprising a first power distribution system coupled to the first antenna and configured to output the electrical power signal to the first antenna; and
the turret subassembly further comprising a second power distribution system coupled to the second antenna, the second power distribution system comprising an electrical component, the second power distribution system configured to:
receive the electrical power signal from the second antenna; and
electrically power the electrical component.

6. The turret system of claim 1, wherein the first antenna has a flat ring shape with the first external radius and a first internal radius, and the second antenna has a flat ring shape with the first external radius and a second internal radius.

7. The turret system of claim 6, wherein the first internal radius is equal to the second internal radius.

8. The turret system of claim 1, wherein the base subassembly further comprises a first optical transmitter configured to transmit a first optical signal, and the turret subassembly further comprises a first optical receiver configured to receive the first optical signal during rotation of the second turret mounting interface with respect to the first turret mounting interface.

9. The turret system of claim 8, wherein the turret subassembly further comprises a second optical transmitter configured to transmit a second optical signal, and the base subassembly further comprises a second optical receiver configured to receive the second optical signal during rotation of the second turret mounting interface with respect to the first turret mounting interface.

10. The turret system of claim 1, wherein the second antenna is further configured to wirelessly receive the electrical power signal from the first antenna during rotation of the second turret mounting interface with respect to the first turret mounting interface through at least 360°.

11. The turret system of claim 1, wherein the second antenna is further configured to continuously wirelessly receive the electrical power signal from the first antenna during rotation of the second turret mounting interface with respect to the first turret mounting interface.

12. The turret system of claim 1, wherein the distance between the first antenna and the second antenna is at least one (1) inch.

13. The turret system of claim 12, wherein the distance between the first antenna and the second antenna is at least three (3) inches.

14. The turret system of claim 13, wherein the distance between the first antenna and the second antenna is at least seven (7) inches.

15. The turret system of claim 1, further comprising a vehicle body, wherein the base subassembly is mounted to the vehicle body.

16. The turret system of claim 15, wherein the vehicle body is an armored fighting vehicle body.

17. The turret system of claim 1, wherein the turret subassembly further comprises an object detection subassembly configured to detect objects using one of a group consisting of: imaging, RADAR, LIDAR, or SONAR.

18. An antenna system for a turret comprising:
a first antenna positioned in a first plane and having a first spiral configuration having a first external radius, the first antenna configured to:
be mounted in a center of a first turret mounting interface of a turret base; and
wirelessly transmit an electrical power signal; and
a second antenna positioned in a second plane that is parallel to and positioned a distance from the first plane and having a second spiral configuration having the first external radius, wherein the first spiral configuration and the second spiral configuration are a same spiral configuration aligned along a common axis, the second antenna configured to:
be mounted in a center of a second turret mounting interface of a turret subassembly;
rotate with respect to the first antenna in response to rotation of the second turret mounting interface with respect to the first turret mounting interface; and
wirelessly receive the electrical power signal from the first antenna.

19. The antenna system of claim 18, wherein the second antenna is further configured to wirelessly receive the electrical power signal from the first antenna during rotation of the second antenna with respect to the first antenna.

20. A method of wirelessly transferring power comprising:
providing an electrical power signal from an electrical component of a base subassembly of a turret system to a first antenna having a first spiral configuration mounted in a center of a first turret mounting interface disposed in the base subassembly, the first antenna being positioned in a first plane and having a first external radius;
wirelessly transmitting the electrical power signal from the first antenna;
receiving the electrical power signal from the first antenna by a second antenna having a second spiral configuration mounted in a center of a second turret mounting interface, the second turret mounting interface disposed in a turret subassembly of the turret system, the second antenna configured to rotate with respect to the first antenna in response to the second turret mounting interface rotating with respect to the first turret mounting interface, the second antenna having the first external radius and being positioned in a second plane that is parallel to and positioned a distance from the first plane, wherein the first spiral configuration and the second spiral configuration are a same spiral configuration aligned along a common axis; and providing the electrical power signal from the second antenna to an electrical component of the turret subassembly coupled to the second antenna.

* * * * *